(12) United States Patent
Yoon et al.

(10) Patent No.: US 7,993,026 B2
(45) Date of Patent: Aug. 9, 2011

(54) LIGHT SOURCE AND BACKLIGHT MODULE WITH THE SAME

(75) Inventors: Daekeun Yoon, Beijing (CN); Chulyoun Kim, Beijing (CN); Haijun Liu, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 238 days.

(21) Appl. No.: 12/129,081

(22) Filed: May 29, 2008

(65) Prior Publication Data

US 2009/0073682 A1 Mar. 19, 2009

(30) Foreign Application Priority Data

Sep. 13, 2007 (CN) .......................... 2007 1 0121734

(51) Int. Cl.
*F21V 14/00* (2006.01)
*F21V 5/02* (2006.01)
(52) U.S. Cl. .... 362/255; 362/256; 362/224; 362/217.02
(58) Field of Classification Search .................. 362/224, 362/614, 255, 256, 217.01, 217.02, 260, 362/261, 263, 339, 340, 337, 215, 311.01, 362/331.06, 555, 551, 628; 313/634, 635, 313/493, 498, 512
See application file for complete search history.

(56) References Cited

U.S. PATENT DOCUMENTS

| | | | | |
|---|---|---|---|---|
| 2,366,216 A | * | 1/1945 | Roberts | 362/256 |
| 4,991,070 A | * | 2/1991 | Stob | 362/223 |
| 5,363,009 A | * | 11/1994 | Monto | 313/110 |
| 5,481,637 A | * | 1/1996 | Whitehead | 385/125 |
| 5,971,570 A | * | 10/1999 | Simon | 362/336 |
| 6,179,443 B1 | * | 1/2001 | Weber | 362/255 |
| 6,543,912 B1 | * | 4/2003 | Simon | 362/327 |
| 2007/0018580 A1 | * | 1/2007 | Kupper et al. | 313/634 |
| 2008/0122361 A1 | * | 5/2008 | Lapatovich et al. | 313/634 |

FOREIGN PATENT DOCUMENTS

| | | |
|---|---|---|
| JP | 09-259626 A | 10/1997 |
| JP | 10-091079 A | 4/1998 |
| JP | 11-096822 A | 4/1999 |
| JP | 11-167809 A | 6/1999 |
| JP | 2003-303572 A | 10/2003 |
| KR | 1020060125289 A * | 12/2006 |
| KR | 1020060135209 A | 12/2006 |
| KR | 1020070045009 A | 5/2007 |

* cited by examiner

*Primary Examiner* — Bao Q Truong
(74) *Attorney, Agent, or Firm* — Ladas & Parry LLP

(57) ABSTRACT

The invention disclosed a light source, comprising a light tube and a plurality of prism members disposed on an outer surface of the light tube for reducing amount of external lights entering the light tube. According to the invention, the prism members disposed on the outer surface of the light tube can not only focus the light emitting from the light tube, but also increase the possibility of total reflection of the incident light.

6 Claims, 5 Drawing Sheets

LIGHT SOURCE AND BACKLIGHT MODULE WITH THE SAME

BACKGROUND

The embodiment of the invention relates to a light source and a backlight module with the light source.

A backlight module of a conventional liquid crystal device (LCD) is a component for providing light for display and can be widely employed in various applications such as information, communication and consumer products. Among them, light emitting diode (LCD) backlight modules draw more and more attention of manufacturers due to their advantages such as low power consumption, full color saturation, low contamination, long service life, etc. As shown in FIGS. 1A and 1B, a conventional LED backlight module comprises a bottom reflective plate 10, a light guide plate 11 converting a linear light source into a planar light source, a lower diffuse plate 12, a lower prism plate 13, an upper prism plate 14, and an upper diffuse plate 15 that are disposed sequentially on top of one another. The lower and upper diffuse plates 12 and 15 are used to diffuse the incident light. The lower and upper prism plates 13 and 14 are used to improve light intensity of the incident light. A light source 16 is disposed on both sides of the light guide plate 11. The light source 16 is enclosed by a reflective cover 17 reflecting the light from the light source 16 toward the light guide plate 11. The backlight module may further comprise other necessary components such as a support frame.

A cold cathode fluorescence lamp (CCFL) is a typical linear light source used for a LCD backlight. As shown in FIG. 2, a CCFL comprises a transparent light tube 1 with fluorescence material coated on the inner surface of the light tube 1 and a positive electrode 2 and a negative electrode 3 that are disposed on opposing ends of the light tube 1. Inert gas such as Ar and Ne gas as well as a trace amount of Hg gas is filled within the light tube 1. During operation of the CCFL, a high voltage is applied across the electrodes 2 and 3 to fire a discharging process. The Hg gas is thus excited to emit a UV light, which in turn excites the fluorescent material coated on the inner surface of the light tube 1 to emit a visible light. FIG. 3 illustrates a conventional backlight module with a light source such as a CCFL. As shown in FIG. 3, a part of the light from the light tube 1 is transmitted directly into the light guide plate 11 along a light path "a," a part of the light is reflected into the light guide plate 11 by the cover 17 along a light path "b," while a part of the light is reflected back into the light tube 1 by either the cover 17 or the light guide plate 11 and partially absorbed by the light tube 1. In a conventional backlight module, such absorption can cause a loss up to more than 30% of all light emitted from the light source.

SUMMARY

According to one embodiment of the invention, there is provided a light source, comprising a light tube and a plurality of prism members disposed on an outer surface of the light tube for reducing amount of external lights entering the light tube.

Preferably, the prism member can be an elongated prism bar or a pyramid-like prism block. The prism bar can have a cross-sectional shape selected from the group consisting of triangle, trapezoid, and crown shape. An apex angle of the triangle can be in a range of about 50 to about 160 degrees. The prism block can be selected from the group consisting of triangular pyramid, rectangular pyramid, cone, truncated cone, and dome shape. An apex angle of the pyramid or the cone can be in a range of about 50 to about 160 degrees. A longitude direction of the prism bar can be either parallel or perpendicular to a longitude direction of the light tube. An apex ridge line of the prism bar can be either a straight line or a curve line.

According to another embodiment of the invention, there is provided a backlight module, comprising a light guide plate, at least one light source and a reflective cover enclosing the light source. The light source can be disposed on at least one side of the light guide plate. The light source comprises a plurality of prism members disposed on an outer surface of the light tube for reducing amount of external lights entering the light tube.

According to the invention, the prism members disposed on the outer surface of the light tube can not only focus the light emitting from the light tube, but also increase the possibility of total reflection of the incident light. Therefore, the embodiments of the invention have one or more of the following advantages. The amount of light which is emitted from the light tube and reflected back into the light tube can be reduced, thus reducing the light loss of light source to about 4% of the light quantity of the light tube. The illumination of the light source can be also improved while the power consumption of the light source can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

According to an embodiment of the invention, an improved surface structure of a light tube of a light source in a liquid crystal display (LCD) is provided, thus reducing the amount of light reflect back into the light tube. Therefore the light loss of the light source can be reduced. The illumination of the light source can be enhanced while the energy loss of the light source can be reduced. According to the embodiment of the invention, a plurality of optical members, such as prism members, are disposed on the outer surface of the light tube of the light source. The prism member can be a prism bar or a pyramid-like prism block. The prism bars and the prism blocks can be disposed throughout the outer surface of the light tube in a regular interval or in a certain density. The prism bars and the prism blocks can be also disposed on only a part of the light tube. An apex ridge of the prism bars can be arranged in a straight line or a corrugated line. The prism members can be formed integrally on the light source. Alternatively, the prism members and the light tube can be formed separately and then assembled together. The optical mechanism of the embodiment of the invention will be discussed by an example in which the prism member is a prism bar with a triangle cross sectional shape.

Figure 1A:
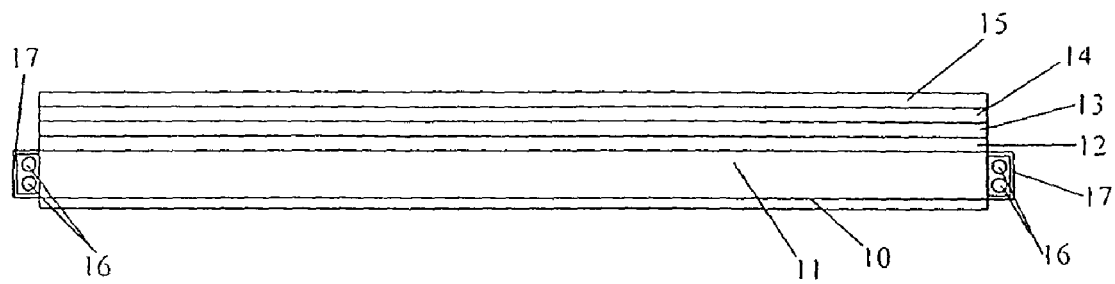
FIG. 1A is a schematic view showing a conventional LCD backlight module.
Figure 1B:
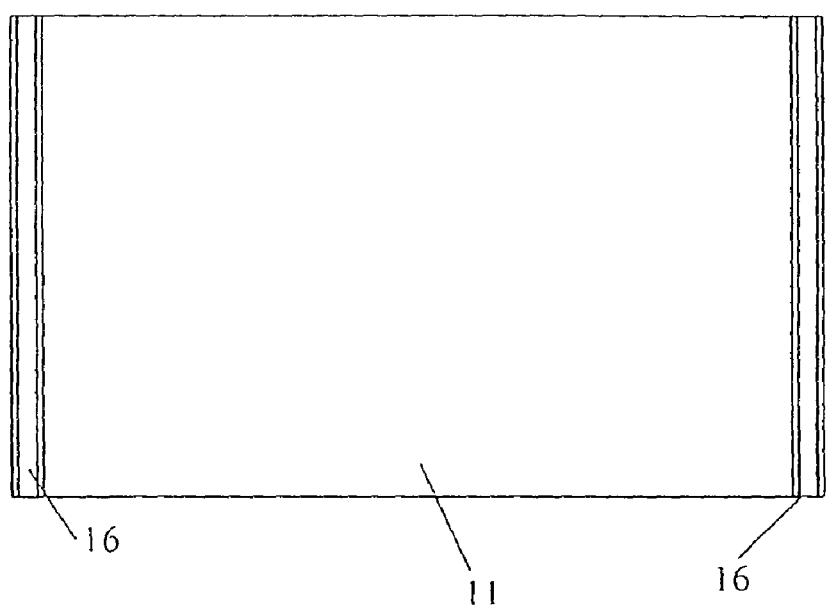
FIG. 1B is a schematic plan view showing a conventional LCD backlight module.
Figure 2:
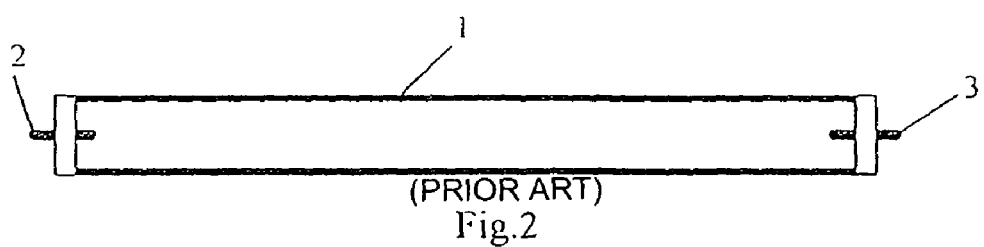
FIG. 2 is a cross sectional view showing a conventional CCFL.
Figure 3:
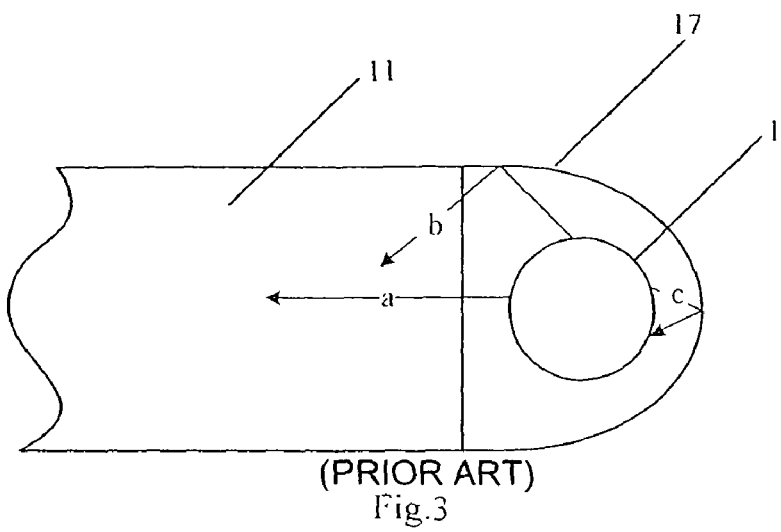
FIG. 3 illustrates a conventional light source in the LCD backlight module showing light paths of the light from the light source.
Figure 4A:
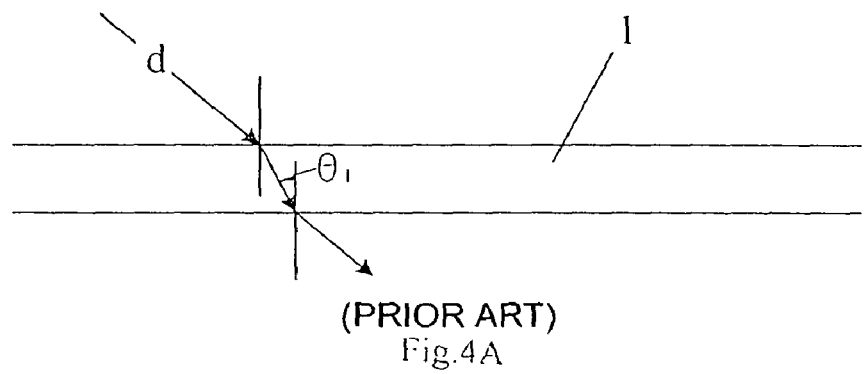
FIG. 4A is a schematic view illustrating optical mechanism of the conventional light source.
Figure 4B:
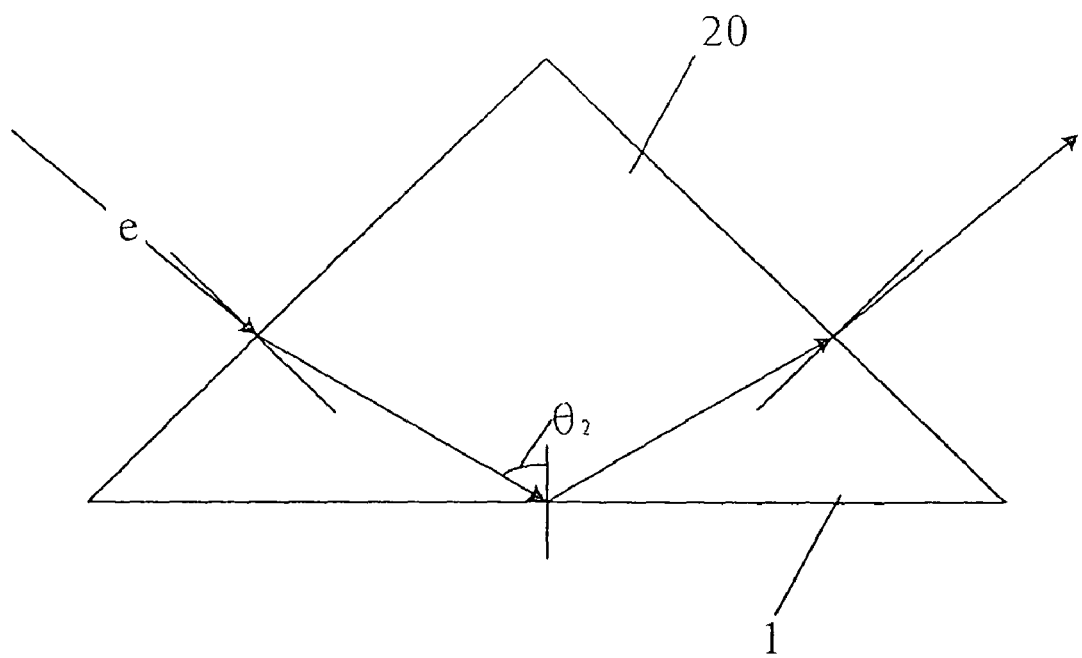
FIG. 4B is a schematic view illustrating optical mechanism of the light source according to the embodiment of the invention.

FIG. 4A is a schematic view illustrating optical mechanism of a conventional light source without the prism members, and FIG. 4B is a schematic view illustrating optical mechanism of the light source 1 with a triangle prism bar 20 as a prism member according to the embodiment of the invention.

It is known that when light is incident from an optical denser medium to an optical thinner medium at a certain angle over a threshold value, a phenomenon called total reflection occurs. Since the light tube 1 is made of a glass material which is an optical denser medium compared with the air or vacuum, when light is incident from the glass light tube 1 into the vacuum inside the light tube 1, the total reflection can occur.

As shown in FIG. 4A, in the case where there is no prism body disposed on the outer surface of the light tube 1, the light emitted from the light tube 1 and then reflected back towards the light tube 1 can be incident into the light tube 1 at an arbitrary angle. For example, when light is incident into the light tube 1 along a light path "d," since the refractive index of the glass is larger than that of the vacuum in the light tube 1, the total reflection does not occur for the light passing through the outer surface of the light tube 1 and reaching the inner surface of the light tube 1. For example, the light along the light path "d" can be transmitted into the light tube 1.

As shown in FIG. 4B, in the case where there is a prism bar 20 with a triangular cross sectional shape disposed on the outer surface of the light tube 1, the light along the light path "e" can be refracted within the prism bar 20, and therefore the incident angle $\theta_2$ of the light incident into the light tube 1 shown in FIG. 4B is larger than the incident angle $\theta_1$ of the light incident into the light tube shown in FIG. 4A, so that the incident angle of some incident light may be larger than the total reflection angle. Such light can be reflected by the outer surface of the light tube 1 and emitted out of the prism bar 20, thereby reducing the amount of light absorbed by the light tube 1. The reduction can depend on the shape of the prism bars or the prism blocks, the arrangement density of the prism bars or the prism blocks on the outer surface of the light tube, etc. The light source according to an embodiment of the invention is further discussed thereafter.

First Embodiment

Figure 5:
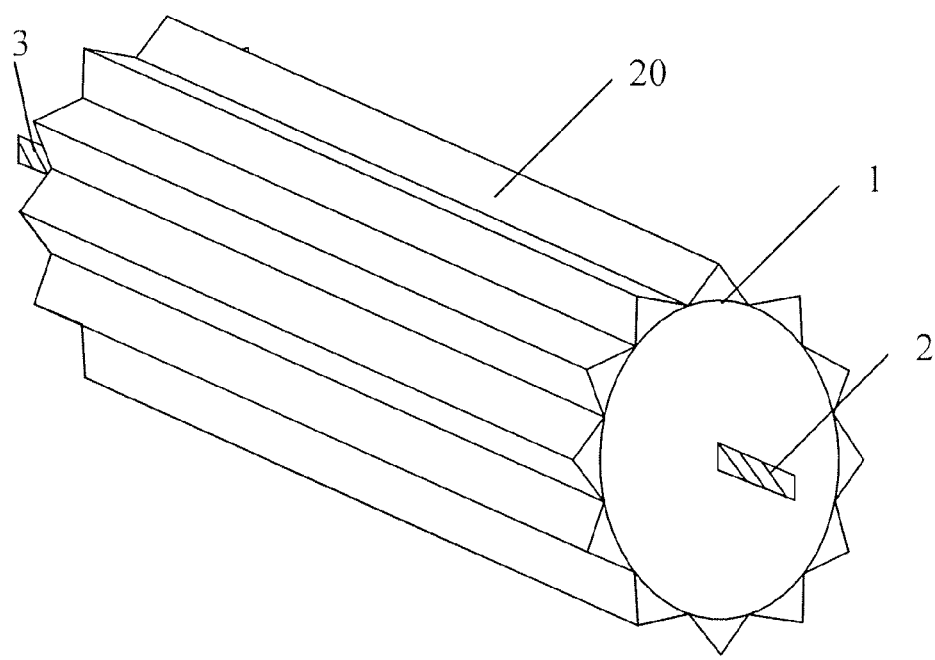
FIG. 5 is a perspective view showing a light source according to the first embodiment of the invention.
Figure 6:
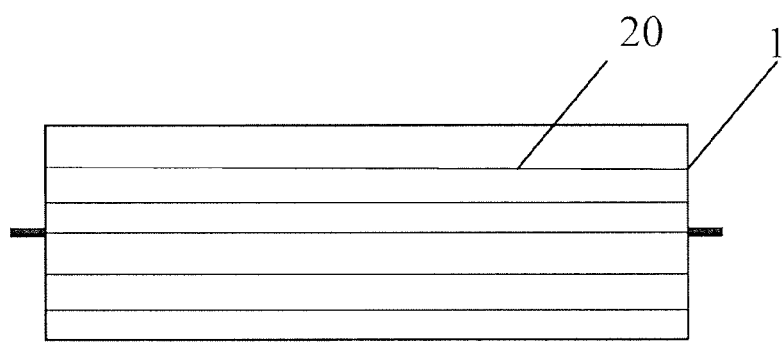
FIG. 6 is a plan view showing a light source according to a first embodiment of the invention.

FIG. 5 is a perspective view showing a light source according to a first embodiment of the invention. As shown in FIG. 5, the light source comprises a light tube 1 and a positive electrode 2 and a negative electrode 3 disposed on opposing ends of the light tube 1. A plurality of prism bars 20 are disposed on the outer surface of the light tube 1. The prism bars 20 may be arranged parallel with each other. The longitude direction of the prism bars 20 may be parallel with the axial direction of the light tube 1, as shown in FIG. 6. The cross sectional shape of the prism bar 20 may be a triangle such as an isosceles right triangle for example, as shown in FIG. 4B.

In the present embodiment, the prism bar 20 can be formed integrally with the light tube 1. The cross sectional shape of the prism bar 20 can be in a triangle shape with an apex angle ranging from about 50 to about 160 degree. The isosceles right triangle is preferable in the embodiment of the invention. In the present embodiment, the light tube 1 and the prism bar 20 can be both mode of a glass material with a total reflection angle of about 42 degree. The following result can be obtained by an optical simulation test. The measured transmittance of the light from the light tube 1 can reach 99.27% outside of the prism bar 20, while the measured transmittance of the external light into the light tube 1 can only be about 9.73% inside the light tube 1. Therefore according to the present embodiment, the light usage of the light source can be improved approximately by more than 25%, the illumination of the light source can be improved by about 30%, thus improving the efficiency of the light source and reducing the power consumption.

Second Embodiment

Figure 7:
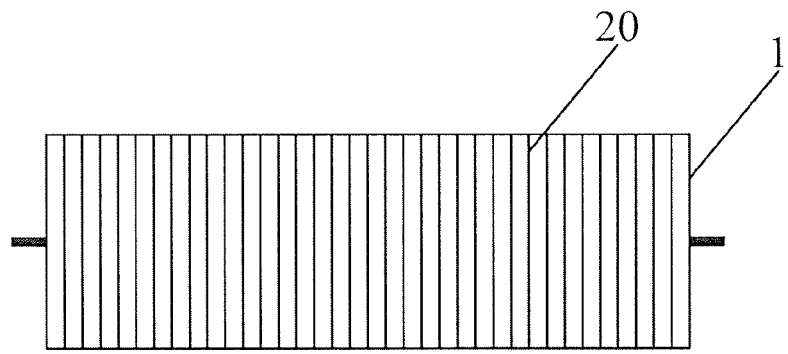
FIG. 7 is a plan view showing a light source according to a second embodiment of the invention.

FIG. 7 is a plan view showing a light source according to a second embodiment of the invention. The present embodiment is substantially the same as the first embodiment, except that the triangular prism bar 20 extends in a direction perpendicular to the axial direction of the light tube 1.

According to the present embodiment, the amount of light incident into the light tube 1 can be improved, the illumination of the light source can be enhanced, and the power consumption of the light source can be reduced.

Figure 8:
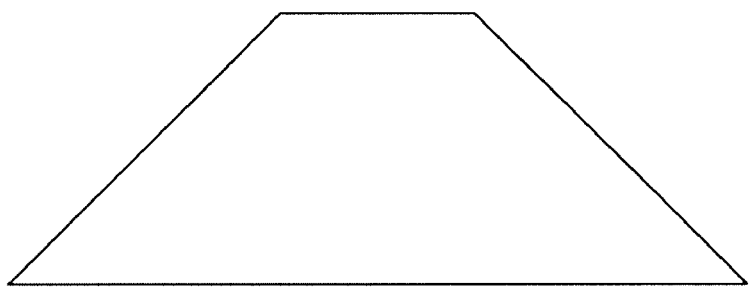
FIGS. 8 and 9 and schematic views showing the cross-sectional shapes of the prism in the light source according to the first and second embodiment of the invention.
Figure 9:
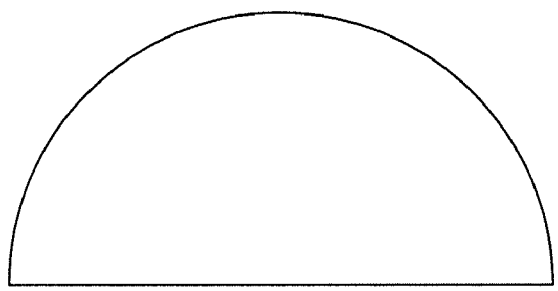

In the first and the second embodiments, the cross sectional shape of the prism bar can be a triangle, a trapezoid, or a crown shape, for example, as shown in FIGS. 8 and 9, respectively. The surface of the prism members can be a curved surface, as long as the prism bar can render the incident angle of the light incident into the light tube larger than or equal to the total reflection angle.

Third Embodiment

Figure 10:
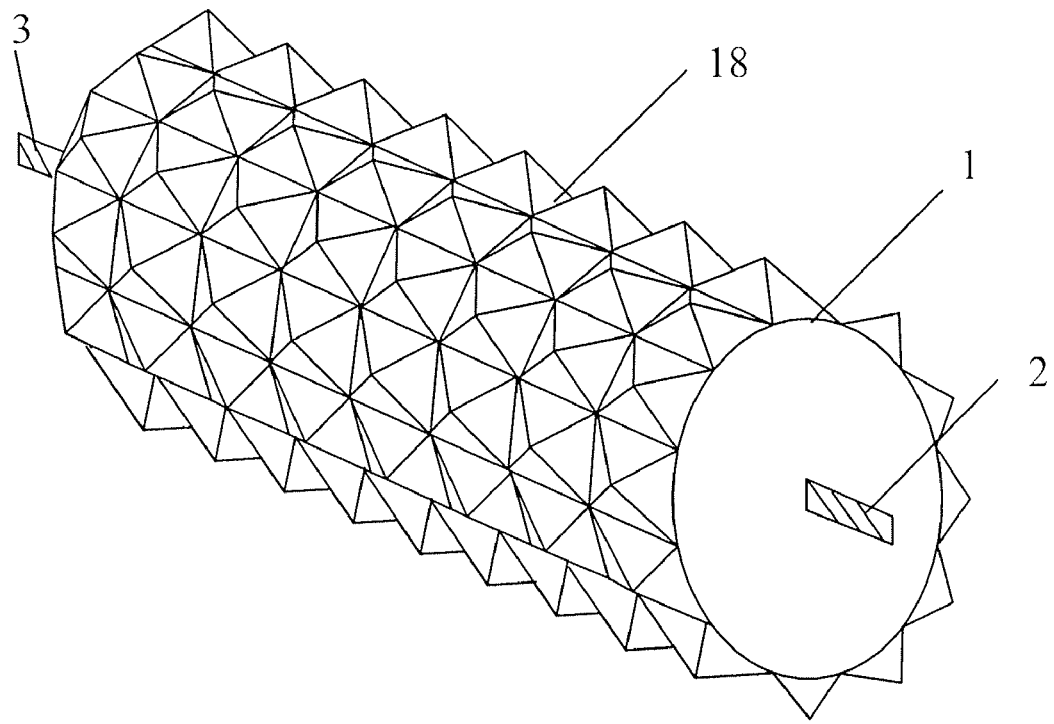
FIG. 10 is a perspective view showing a light source according to a third embodiment of the invention.

FIG. 10 is a perspective view showing a light source according to a third embodiment of the invention. The present embodiment is substantially the same as the above embodiments, except that each prism member is a pyramid-like prism block 18.

According to the present embodiment, the amount of light incident into the light tube 1 can be improved, the illumination of the light source can be enhanced, and the power consumption of the light source can be reduced.

In the present embodiment, the shape of the prism block 18 can be selected from a group consisting of triangular pyramid, rectangular pyramid, cone, truncated cone and dome, as long as the prism block can render the incident angle of the light incident into the light tube larger than or equal to the total reflection angle.

In the above embodiments, the prism member can be formed integrally with the light tube. For example, the outer surface of a light tube can be processed so as to form prism bars or prism blocks thereon. Alternatively, the prism members and the light source can be also formed separately and then the prism members are attached on the outer surface of the light source.

Figure 11:
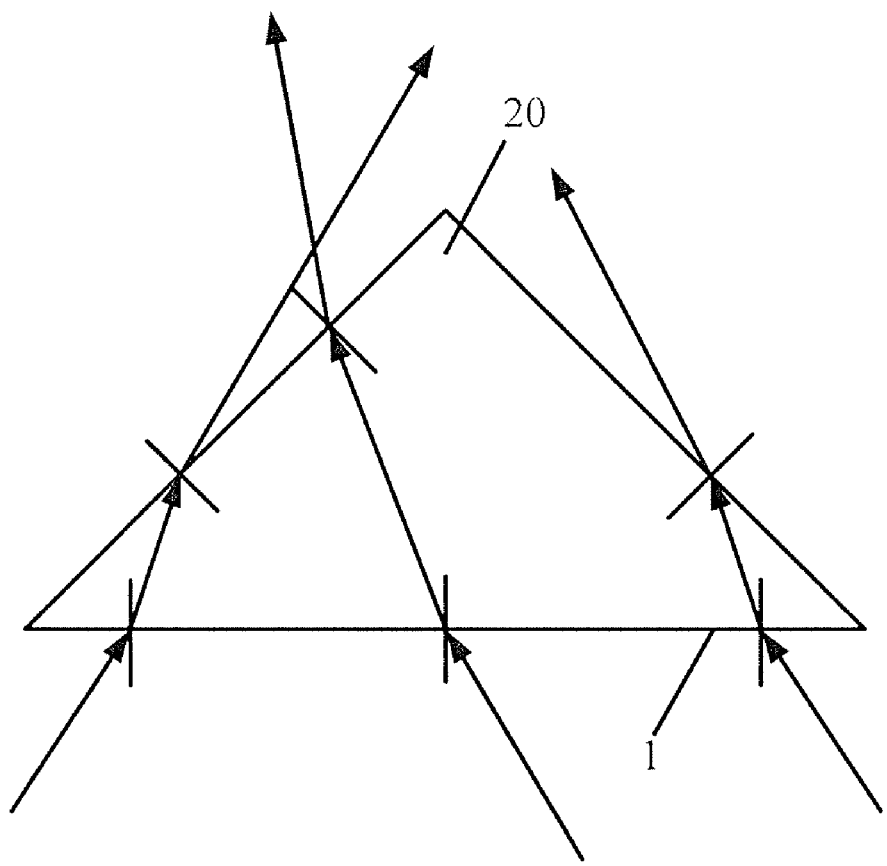
FIG. 11 is a schematic view showing light path of the lights focused by the prism member according to the embodiments of the invention.

In the above embodiment, not only the reflectivity of the external light can be improved, but also the light emitted from the light source can be focused by the prism member, as shown in FIG. 11.

Fourth Embodiment

Figure 12:
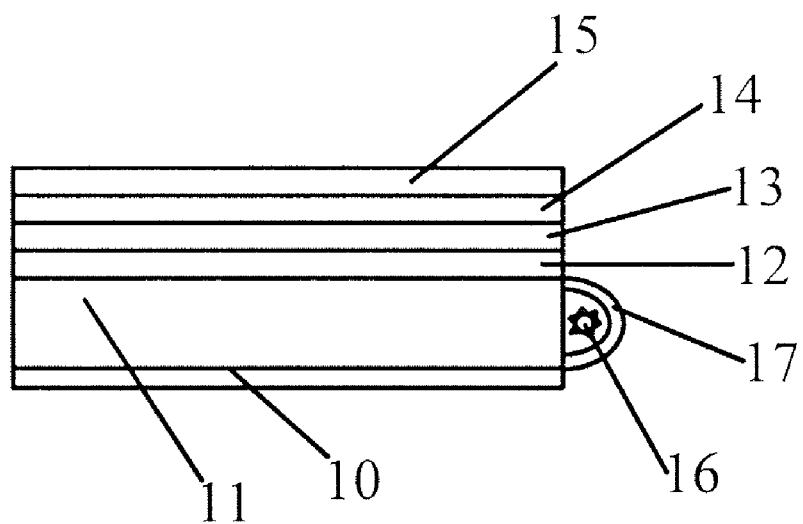
FIG. 12 is a schematic view showing a LCD backlight module according to an embodiment of the invention.

FIG. 12 is a schematic view showing a LCD backlight module according to a fourth embodiment of the invention. As shown in FIG. 12, the backlight module comprises a bottom reflective plate 10, a light guide plate 11 converting a linear light source into a planar light source, a lower diffuse plate 12, a lower prism plate 13, an upper prism plate 14 and an upper diffuse plate 15 disposed sequentially on top of one another. A light source 16 is disposed on at least one side of light guide plate 11. The light source 16 can be enclosed by a reflective cover 17 reflecting the light from the light source 16 into the light guide plate 11. The light source 16 may be a light source according to one of the first~third embodiments of the invention.

In the present embodiment, the bottom reflective plate 10, the lower diffuse plate 12, the lower prism plate 13, the upper prism plate 14 and the upper diffuse plate 15 can be optionally selected. Other optical element can be further added as necessary.

According to the present embodiment, the light source 16 can be any type of the light source according to the above embodiments. Since the reflectivity of the surface of the light tube can be improved, the illumination of the light source can be enhanced and the power consumption of the light source can be reduced, the characteristics of the backlight module are in turn improved.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A light source, comprising a light tube and a plurality of prism members disposed on an outer surface of the light tube for reducing amount of external lights entering the light tube, and a reflector reflecting light from the light tube, wherein the prism members comprise pyramid-like prism blocks or dome shape prism blocks, and are provided at least on the outer surface of the light tube facing the reflector.

2. The light source according to claim 1, wherein the prism block is selected from the group consisting of triangular pyramid, rectangular pyramid, cone, and truncated cone.

3. The light source according to claim 2, wherein an apex angle of the pyramid or the cone is in a range of about 50 to about 160 degrees.

4. A backlight module, comprising:
   a light guide plate;
   at least one light source, disposed on at least one side of the light guide plate; and
   a reflective cover enclosing the light source and reflecting light from the light source, wherein the light source comprises a plurality of prism members disposed on an outer surface of the light tube for reducing amount of external lights entering the light tube, and the prism members comprise pyramid-like prism blocks or dome shape prism blocks, and are provided at least on the outer surface of the light tube facing the reflective cover.

5. The backlight module according to claim 4, wherein the prism block is selected from the group consisting of triangular pyramid, rectangular pyramid, cone, and truncated cone.

6. The backlight module according to claim 5, wherein an apex angle of the pyramid or the cone is in a range of about 50 to about 160 degrees.

* * * * *